United States Patent
Reagan et al.

(10) Patent No.: US 9,898,871 B1
(45) Date of Patent: Feb. 20, 2018

(54) SYSTEMS AND METHODS FOR PROVIDING AUGMENTED REALITY EXPERIENCE BASED ON A RELATIVE POSITION OF OBJECTS

(71) Applicant: DISNEY ENTERPRISES, INC., Burbank, CA (US)

(72) Inventors: Richard Reagan, Burbank, CA (US); Sagar Mistry, Burbank, CA (US); Nathan Allison, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 15/286,353

(22) Filed: Oct. 5, 2016

(51) Int. Cl.
| | |
|---|---|
| *G09G 5/00* | (2006.01) |
| *G06T 19/00* | (2011.01) |
| *G06T 7/00* | (2017.01) |
| *G06K 9/62* | (2006.01) |
| *G06T 19/20* | (2011.01) |
| *G06K 9/52* | (2006.01) |

(52) U.S. Cl.
CPC .............. *G06T 19/006* (2013.01); *G06K 9/52* (2013.01); *G06K 9/6267* (2013.01); *G06T 7/004* (2013.01); *G06T 19/20* (2013.01)

(58) Field of Classification Search
CPC ....... G06T 19/00; G06T 19/006; G06T 19/20; G06T 7/004; G06K 9/52; G06K 9/6267
See application file for complete search history.

(56) References Cited

U.S. PATENT DOCUMENTS

| | | |
|---|---|---|
| 7,661,592 B1 | 2/2010 | Chisholm |
| 7,690,975 B2 | 4/2010 | Watanabe |
| 8,358,320 B2 * | 1/2013 | Zhou ...................... G09B 19/00 345/632 |

(Continued)

FOREIGN PATENT DOCUMENTS

| | | |
|---|---|---|
| WO | 199604968 | 2/1996 |
| WO | 2007119912 A1 | 10/2007 |

OTHER PUBLICATIONS

Kato et al., "Marker Tracking and HMD Calibration for a Video-based Augmented Reality Conferencing System", IEEE, Aug. 6, 2002, p. 1-10.*

(Continued)

*Primary Examiner* — Robert Craddock
(74) *Attorney, Agent, or Firm* — Sheppard Mullin Richter & Hampton LLP (57) ABSTRACT

This disclosure relates to system and methods for providing augmented reality experience based on a relative position of objects. Augmented reality experience based on a relative position of object may be provided by detecting a first object and a second object. Positions and orientations of the first object and the second object may be determined. A first visual effect may be determined for the first object and a second visual effect may be determined for the second object. Overlay positions and orientations for the first visual effect and the second visual effect may be determined. An overlay image including the first visual effect and the second visual effect may be determined, and the overlay image may be displayed. An interaction between the first visual effect and the second visual effect may be determined based on the relative position of the first object and the second object.

20 Claims, 6 Drawing Sheets

(56) References Cited

U.S. PATENT DOCUMENTS

| | | |
|---|---|---|
| 8,764,571 B2 | 7/2014 | Sarmenta |
| 9,168,455 B2 | 10/2015 | Weisman |
| 2008/0139309 A1 | 6/2008 | Siegel |
| 2011/0304639 A1* | 12/2011 | Noge ............... G06T 15/04 345/584 |
| 2011/0304640 A1* | 12/2011 | Noge ............... G06T 19/006 345/589 |
| 2012/0092328 A1* | 4/2012 | Flaks ............... G02B 27/017 345/419 |
| 2014/0002472 A1* | 1/2014 | Sobeski ............ G09G 5/026 345/582 |
| 2015/0262427 A1* | 9/2015 | Kuranoshita ...... G06T 19/006 345/633 |
| 2016/0033770 A1* | 2/2016 | Fujimaki .......... G06T 19/006 345/8 |
| 2016/0364912 A1* | 12/2016 | Cho ................. G06T 19/006 |

OTHER PUBLICATIONS

Kato. et al., "Virtual Object Manipulation on a Table-Top AR Environment", IEEE, Dec. 2000, 111-119.*

Aronson, Phil, "Is Augmented Reality the Future of 3DS Gaming?", printed from URL: http://videogamewriters.com/is-augmented-reality-the-future-of-3ds-gaming-11331, May 24, 2011, 4 pages.

Grier, Jason, "Skylanders Announces Physical & Digital Battle Card Game: Skylanders Battlecast", printed from URL: http://www.skylandersinquirer.com/2015/08/18/skylanders-announces-physical-digital-battle-card-game-skylanders-battlecast/, Aug. 18, 2015, 9 pages.

TheGreen, "Zelda Augmented Reality Card", printed from URL: http://www.zeldadungeon.net/2011/02/zelda-augmented-reality-card/, Feb. 19, 2011, 7 pages.

* cited by examiner

SYSTEMS AND METHODS FOR PROVIDING AUGMENTED REALITY EXPERIENCE BASED ON A RELATIVE POSITION OF OBJECTS

FIELD

This disclosure relates to systems and methods for providing augmented reality experience based on a relative position of objects.

BACKGROUND

Augmented reality experience may include multiple objects augmented with visual effects. Such augmented reality experience do not provide for different interaction between visual effects based on the relative position of the objects.

SUMMARY

This disclosure relates to providing augmented reality experience based on a relative position of objects. Augmented reality experience based on a relative position of object may be provided by detecting a first object, a second object, and/or other objects. Positions and/or orientations of the first object, the second object, and/or other objects may be determined. A first visual effect, and/or other visual effects may be determined for the first object, a second visual effect and/or other visual effects may be determined for the second object, and/or other visual effects may be determined for other objects. Overlay positions and/or orientations for the first visual effect, the second visual effect, and/or other visual effects may be determined. An overlay image including the first visual effect, the second visual effect, and/or other visual effects may be determined. The overlay image may be displayed. An interaction between the first visual effect, the second visual effect, and/or other visual effects may be determined based on the relative position of the first object, the second object, and/or other objects.

A system for providing augmented reality experience based on a relative position of objects may include one or more of a display, an image sensor, one or more physical processors, and/or other components. In some implementations, the image sensor and/or the one or more physical processors may be carried on the display. The field of view of the image sensor may be a function of the position and/or the orientation of the display.

The display may be configured to display an overlay image and/or other information. In some implementations, the display may include one or more of a head-mounted display, an optical head-mounted display, a see-through display, an optical see-through display, a video see-through display, a visor, eyeglasses, sunglasses, a smartphone, a tablet, a mobile device, a projector, and/or other displays.

The image sensor may be configured to generate visual output signals conveying visual information within a field of view of the image sensor. The image sensor may include one or more of a charge-coupled device sensor, an active pixel sensor, a complementary metal-oxide semiconductor sensor, an N-type metal-oxide-semiconductor sensor, and/or other image sensors.

The one or more physical processors may be configured by machine-readable instructions. Executing the machine-readable instructions may cause the one or more physical processors to facilitate providing augmented reality experience based on a relative position of objects. The machine-readable instructions may include one or more computer program components. The computer program components may include one or more of a detection component, an object position and orientation component, a visual effects component, an overlay position and orientation component, an overlay image component, a display component, an interaction component, and/or other computer program components.

The detection component may be configured to detect one or more objects. One or more objects may be detected based on the visual output signals. When an object is within the field of view of the image sensor, the detection component may be configured to detect the object. The detection component may detect a first object when the first object is within the field of view of the image sensor. The detection component may detect a second object when the second object is within the field of view of the image sensor. In some implementations, the first object may include a first card and/or other physical objects. The second object may include a second card and/or other physical objects.

The object position and orientation component may be configured to determine a position and/or orientation of one or more objects. The position and orientation of an object may be determined based on the visual output signals. When an object is within the field of view of the image sensor, the object position and orientation component may be configured to determine the position and orientation of the object. The object position and orientation component may determine a position and orientation of the first object when the first object is within the field of view of the image sensor. The object position and orientation component may determine a position and orientation of the second object when the second object is within the field of view of the image sensor.

The visual effects component may be configured to determine one or more visual effects for one or more objects. The visual effects component may determine a first visual effect for a first object and a second visual effect for a second object. In some implementations, a visual effect may be determined based on the object or a part of the object. In some implementations, a visual effect may be determined based on an augmented reality marker disposed on a given object. In some implementations, a visual effect may be determined based on user input. In some implementations, user input may indicate a set of controls for the first visual effect. The set of controls may include a first control and/or other controls defining a first action and/or other actions for the first visual effect and/or other visual effects. The visual effects component may be configured to modify the first visual effect to simulate the first visual effect executing an action corresponding to the user input.

The overlay position and orientation component may be configured to determine an overlay position and/or overlay orientation for a visual effect. The overlay position and/or overlay orientation may be determined based on the position and/or orientation of the object. The overlay position and orientation component may determine an overlay position and/or overlay orientation for the first visual effect based on the position and/or orientation of the first object. The overlay position and orientation component may determine an overlay position and/or overlay orientation for the second visual effect based on the position and/or orientation of the second object.

The overlay image component may be configured to determine one or more overlay images. The overlay image may comprise one or more of a first visual effect, a second visual effect, and/or other visual effects. The first visual effect may be placed within the overlay image according to the overlay position and overlay orientation for the first visual effect. The second visual effect may be placed within the overlay image according to the overlay position and overlay orientation for the second visual effect.

The display component may be configured to effectuate displaying of the overlay image on the display. The displaying may be effectuated so that the first visual effect appears to augment the appearance of the first object and the second visual effect appears to augment the appearance of the second object.

The interaction component may be configured to determine one or more interactions between the first visual effect, the second visual effect, and/or other visual effects. An interaction between the first visual effect, the second visual effect, and/or other visual effects may be determined based on one or more of a relative position of the first object and the second object, a relative position of other objects, and/or other information. In some implementations, the relative position of the first object and the second object may refer to one or more of a distance between the first object and the second object, an orientation of the first object with respect to the second object, and/or information. In some implementations, the interaction between the first visual effect and the second visual effect may be determined further based on user input.

In some implementations, the first visual effect may be characterized by a first status parameter set and/or other information. The first status parameter set may include a first power parameter defining a power of the first visual effect. A power of a visual effect may refer to an ability of the visual effect to influence other visual effects and/or an ability of the visual effect to change influence from other visual effects. The interaction between the first visual effect and the second visual effect may be determined further based on the first status parameter set. In some implementations, the second visual effect may be characterized by a second status parameter set. The second status parameter set may include a second power parameter defining a power of the second visual effect. The interaction between the first visual effect and the second visual effect may be determined further based on the second status parameter set.

In some implementations, the interaction component may be configured to change the first status parameter set. The first status parameter set may be changed based on the interaction between the first visual effect and the second visual effect. In some implementations, the interaction component may be configured to modify the first visual effect. The first visual effect may be modified based on a change to the first status parameter set.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
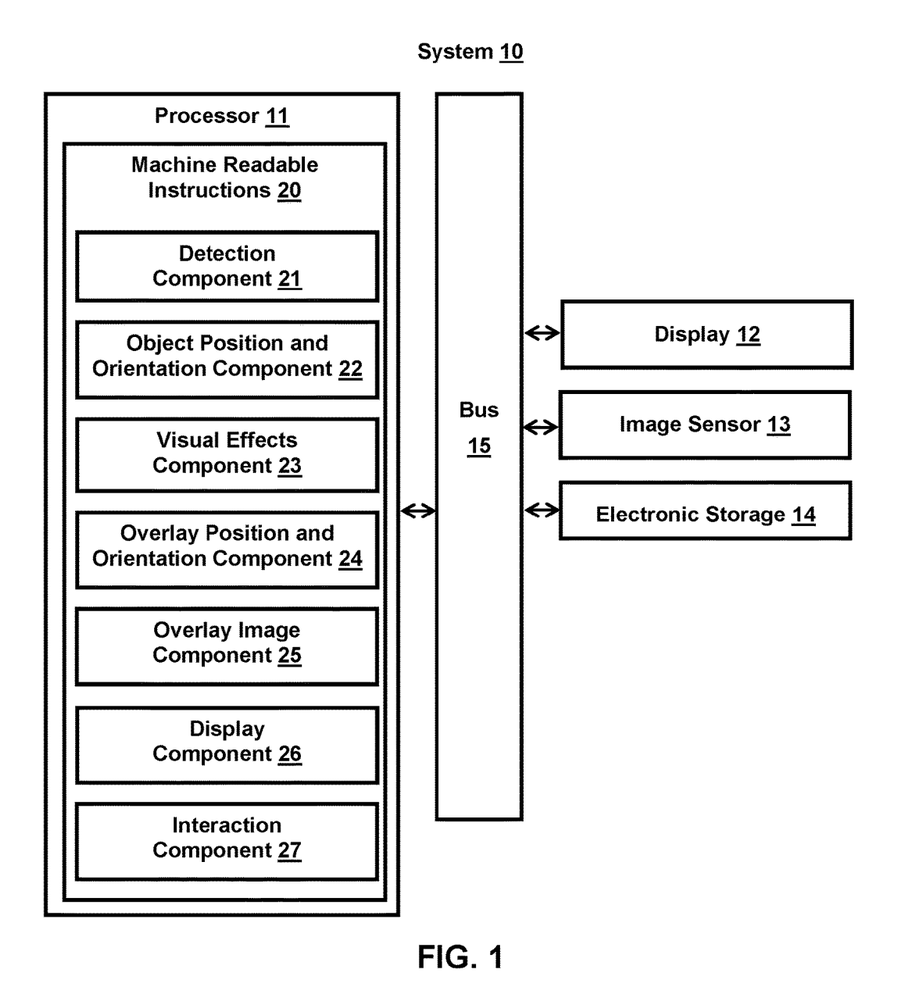
FIG. 1 illustrates a system for providing augmented reality experience based on a relative position of objects.

FIG. 1 illustrates a system 10 for providing augmented reality experience based on a relative position of objects. System 10 may include one or more of processor 11, display 12, image sensor 13, electronic storage 14, bus 15, and/or other components. To provide augmented reality experience based on a relative position of objects, image sensor 13 may generate visual output signals within a field of view of image sensor 13. A first object, a second object, and/or other objects may be detected based on the visual output signals. Positions and/or orientations of the first object, the second object, and/or other objects may be determined based on the visual output signals. A first visual effect and/or other visual effects may be determined for the first object, a second visual effect and/or other visual effects may be determined for the second object, and/or other visual effects may be determined for other objects. Overlay positions and/or orientations for the first visual effect, the second visual effect, and/or other visual effects may be determined based on the positions and/or orientations of the first object, the second object, and/or other objects. An overlay image including the first visual effect, the second visual effect, and/or other effects may be determined. The overlay image may be displayed on display 12. An interaction between the first visual effect, the second visual effect, and/or other visual effects may be determined based on the relative position of the first object, the second object, and/or other objects.

Display 12 may be configured to display an overlay image and/or other information. In some implementations, display 12 may include one or more of a head-mounted display, an optical head-mounted display, a see-through display, an optical see-through display, a video see-through display, a visor, eyeglasses, sunglasses, a smartphone, a tablet, a mobile device, a projector, and/or other displays. In some implementations, processor 11 and/or image sensor 13 may be carried on display 12, and the field of view of image sensor 13 may be a function of the position and/or the orientation of display 12.

Image sensor 13 may be configured to generate visual output signals conveying visual information within the field of view of image sensor 13. Visual information may include one or more of an image, a video, and/or other visual information. When an object is within the field of view of image sensor 13, visual information may include one or more of an image, a video, and/or other visual information regarding the object. Image sensor 13 may include one or more of a charge-coupled device sensor, an active pixel sensor, a complementary metal-oxide semiconductor sensor, an N-type metal-oxide-semiconductor sensor, and/or other image sensors.

Electronic storage 14 may include electronic storage media that electronically stores information. Electronic storage 14 may store software algorithms, information determined by processor 11, information received remotely, and/or other information that enables system 10 to function properly. For example, electronic storage 14 may store visual information (as discussed elsewhere herein), information relating to one or more objects, one or more visual effects, interaction between visual effects, interaction information (as discussed elsewhere herein) and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. In some implementations, processor 11 may be a computing/processing unit of a gaming console. Processor 11 may be configured to execute one or more machine readable instructions 20 to facilitate providing augmented reality experience based on a relative position of objects. Machine readable instructions 20 may include one or more of detection component 21, object position and orientation component 22, visual effects component 23, overlay position and orientation component 24, overlay image component 25, display component 26, interaction component 27 and/or other computer program components.

Detection component 21 may be configured to detect one or more objects. An object may refer to a physical thing that may be detectable by image sensor 13. An object may be two-dimensional or three-dimensional. As a non-limiting example, an object may include one or more of a card, a paper, a book, a package, a figurine, a toy, a tool, and/or other objects. One or more objects may include a first object, a second object, and/or other objects. For example, one or more objects may include ten or more cards to provide visual effects as described herein.

Figure 3:
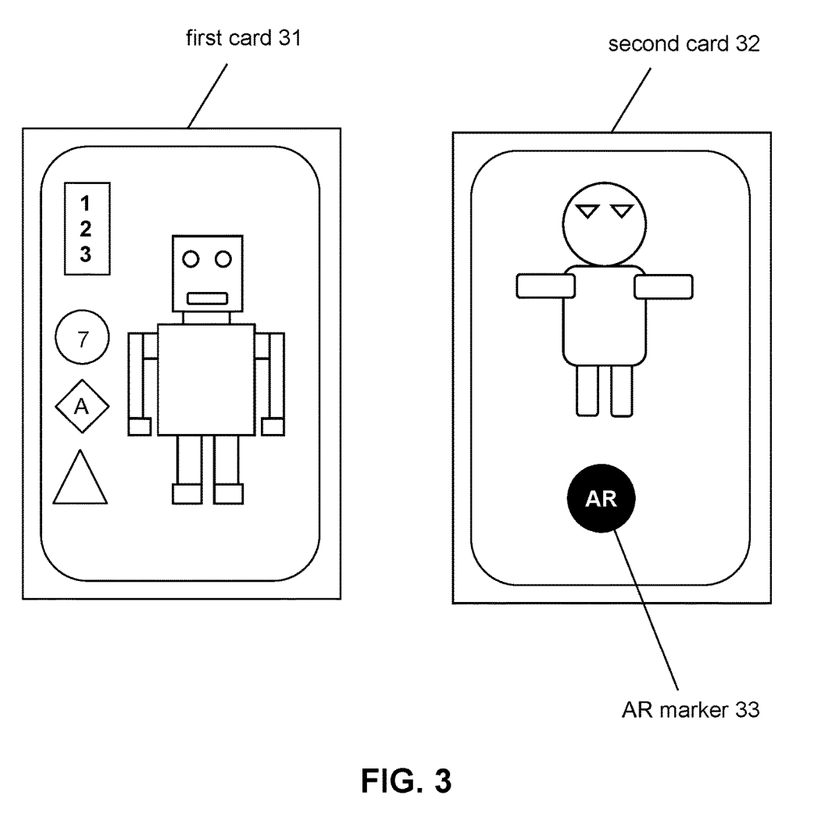
FIG. 3 illustrates examples of cards.

In some implementations, the first object may include a first card and/or other objects and the second object may include a second card and/or other objects. FIG. 3 illustrates non-limiting examples of first card 31 and second card 32. First card 31 and second card 32 may include a view of a thing (e.g., a person, a character, a robot, a monster, a tool, a weapon, an armor, a structure, a furniture, etc.) and/or an effect (e.g., weather condition, environmental change, interaction with visual effect, etc.). For example, first card 31 may include a view of a rectangular robot, and second card 32 may include a view of a rounded robot. The view of rectangular robot and/or rounded robot may include one or more of a frontal view, a back view, a side view, a top view, a bottom view, a perspective view, a partial view, a full view, and/or other views. First card 31 and second card 32 may include information about the thing and/or an effect. For example, first card 31 may include shapes and characters on the left side that provide information about the rectangular robot. Second card 32 may include AR marker 33 that provide information about the rounded robot. Other cards may include shapes, characters, and/or AR markers that provide information about things/effects. Other appearances and configurations of cards are contemplated.

Objects may be detected by detection component 21 based on the visual output signals generated by image sensor 13. When an object is within the field of view of image sensor 13, detection component 21 may be configured to detect the object. For example, a first object may include a figurine of an action hero and a second object may include a toy car. Detection component 21 may detect the figurine when the figurine is within the field of view of image sensor 13. Detection component 21 may detect the toy car when the toy car is within the field of view of image sensor 13.

Figure 4:
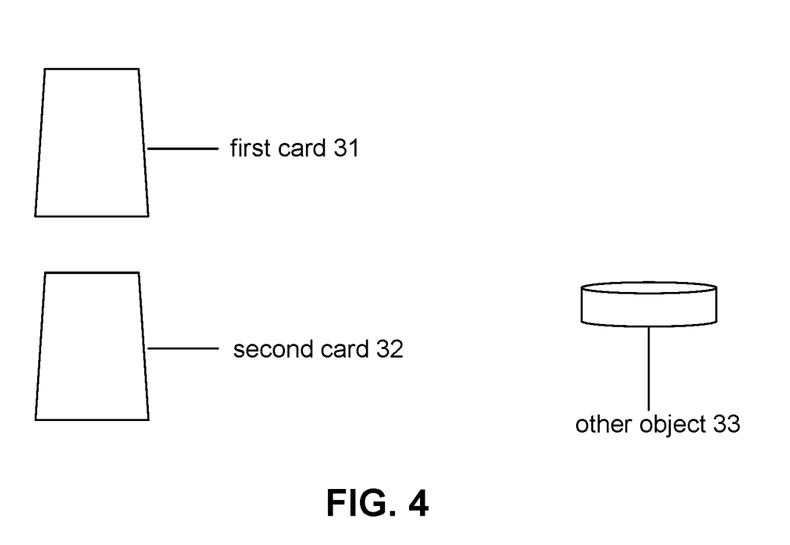
FIG. 4 illustrates an example of three objects.

For example, FIG. 4 illustrates an non-limiting example of objects detected by detection component 21. In FIG. 4, first card 31, second card 32, and other object 33 may be within the field of view of image sensor 13. Detection component 21 may detect one or more of first card 31, second card 32, and/or other object 33 based on the visual output signals.

Object position and orientation component 22 may be configured to determine a position and/or orientation of one or more objects. The position(s) and/or orientation(s) of the object(s) may be determined based on the visual output signals generated by image sensor 13. When an object is within the field of view of image sensor 13, object position and orientation component 22 may be configured to determine the position and/or orientation of the object. For example, object position and orientation component 22 may determine a position and/or orientation of a first object when the first object is within the field of view of image sensor 13. Object position and orientation component 22 may determine a position and/or orientation of a second object when the second object is within the field of view of image sensor 13. For example, in FIG. 4, object position and orientation component 22 may determine positions and/or orientations of one or more of first card 31, second card 32, and/or other object 33 based on the visual output signals.

Visual effects component 23 may be configured to determine one or more visual effects for one or more objects. For example, visual effects component 23 may determine a first visual effect and/or other visual effects for a first object and a second visual effect and/or other visual effects for a second object. A visual effect may refer to one or more information that may be observed visually. A visual effect may be static or dynamic, and may be visually observable at a time, over a period of time, at a location, or over a range of locations. A visual effect may include one or more of an image, a video, and/or other visual effects.

Figure 5:
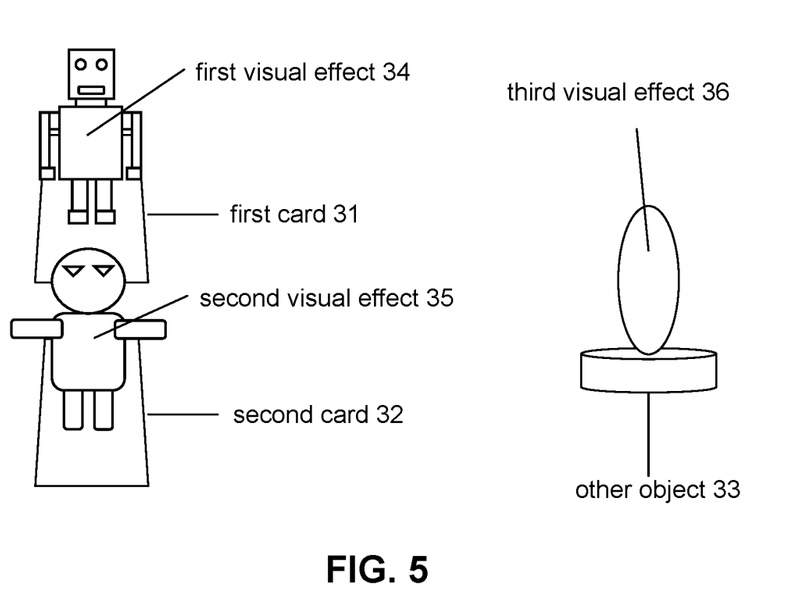
FIG. 5 illustrates an example of visual effects augmenting three objects.

In some implementations, visual effects component 23 may determine one or more visual effects based on an object or a part of an object. Visual effects component 23 may include or retrieve information (for example, a database, etc.) that matches an object or a part of an object to a particular visual effect. For example, FIG. 5 illustrates a non-limiting example of visual effects augmenting first card 31, second card 32, and other object 33. In FIG. 5, visual effects component 23 may determine first visual effect 34 based on first card 31 (or a part of first card 31). Visual effects component 23 may include or retrieve information that matches first card 31 (or a part of first card 31) to first visual effect 34. For example, visual effects component 23 may determine a rectangular robot for first visual effect 34. Other types of visual effect based on an object or a part of an object are contemplated.

In some implementations, visual effects component 23 may determine one or more visual effects based on an augmented reality marker. An augmented reality marker may refer to a marker containing information regarding an object, a visual effect, and/or other information. An augmented reality marker may be two-dimensional or three-dimensional. As a non-limiting example, an augmented reality marker may include one or more of a sticker, a label, a barcode, a quick response (QR) code, and/or other augmented reality markers. One or more augmented reality markers may be carried (e.g., attached to, supported, held, disposed on, printed on, and/or otherwise carried) by an object. Visual effects component 23 may include or retrieve information (for example, a database, etc.) that matches an augmented reality marker to a particular visual effect. For example, in FIG. 5, visual effects component 23 may determine second visual effect 35 based on AR marker 33 (shown in FIG. 3) on second card 32. Visual effects component 23 may include or retrieve information that matches AR marker 33 to second visual effect 35. For example, visual effects component 23 may determine a rounded robot for second visual effect 35. Other types of visual effect based on an augmented reality marker are contemplated.

In some implementations, an augmented reality marker may be placed on the backside of a card. Such placement of augmented reality markers may allow users to insert visual effects into a virtual space without revealing the visual effects to other players. For example, a user may place a "dragon" visual effect in a "castle" visual effect by placing the "dragon" card face-down on/near the "castle" card. Visual effects component 23 may determine the "dragon" visual effect based on the augmented reality marker on the backside of the "dragon" card. Other users may not know what has been placed in the "castle" visual effect until they enter the "castle" visual effect.

In some implementations, visual effects component 23 may determine one or more visual effects based on a user input received through an input device. An input device may refer to a device that allows a user to input information. For example, an input device may include a button device, a touch device, a point device, an imaging device, a sound device, and/or other input devices. A user input may refer to one or more information provided by a user through an input device.

A button device may include a device that allows a user to provide one or more user inputs by using one or more buttons on a device. For example, a user may provide one or more user inputs by typing one or more of characters, numbers, symbols, and/or other input using the button device. As another example, a user may provide one or more user inputs by using one or more buttons corresponding to different user input. A button device may include a separate device or a part of another device. For example, a button device may include a keyboard/buttons coupled to processor 11. As another example, a button device may include a game controller coupled to processor 11. A user may provide one or more user inputs by using one or more buttons on a button device. For example, a user may provide one or more user inputs by using one or more buttons corresponding to one or more of a type, shape, size, color, and/or other information about the visual effect.

A touch device may include a device that allows a user to provide user inputs by touching a user interface of the touch device. A touch device may include a separate device or a part of another device. For example, a touch device may include a touch screen coupled to processor 11. As another example, a touch device may include a mobile device coupled to processor 11. A user may provide one or more user inputs by touching one or more portions of the touch device corresponding to one or more information. For example, a user may provide one or more user inputs by touching one or more portions of the touch device corresponding to one or more of a type, shape, size, color, and/or other information about the visual effect.

A point device may include a device that allows a user to provide user inputs by pointing to one or more locations in a user interface. A user interface may be displayed on display 12 or other displays. A point device may include a separate device or a part of another device. For example, a point device may include a mouse coupled to processor 11. A user may provide one or more user inputs by pointing a cursor controlled by the point device to one or more locations in a user interface corresponding to one or more information. For example, a user may provide one or more user inputs by pointing to one or more locations in a user interface corresponding to one or more of a type, shape, size, color, and/or other information about the visual effect An imaging device may include a device that allows a user to provide user inputs by using an image sensor of the imaging device. An imaging device may include a separate device or a part of another device. For example, an imaging device may include an image sensor coupled to processor 11. As a non-limiting example, an imaging device may include image sensor 13. As another example, an imaging device may include a mobile device coupled to processor 11. A user may provide one or more user inputs by directing the field of view of the imaging device to objects that include information. For example, a user may provide one or more user inputs by directing the field of view of the imaging device to an augmented reality marker, and/or other objects that include one or more of a type, shape, size, color, and/or other information about the visual effect.

A sound device may include a device that allows a user to provide user inputs through voice and/or sounds. A sound device may include a separate device or part of another device. For example, a sound device may include a microphone coupled to processor 11. As another example, a sound device may include a mobile device coupled to processor 11. A user may provide one or more user input by speaking one or more information. For example, a user may provide one or more user inputs by speaking one or more of a type, shape, size, color, and/or other information about the visual effect.

For example, in FIG. 5, visual effects component 23 may determine third visual effect 36 based on user input. Visual effects component 23 may include or retrieve information (for example, a database, etc.) that matches user input to third visual effect 36. For example, visual effects component 23 may determine a visible energy field for third visual effect 36 based on user input. Other types of visual effect based on user input are contemplated.

In some implementations, visual effects component 23 may determine one or more visual effects based on stored information. For example, a visual effect for an object may be changed based on an interaction with another visual effect, as described below. Visual effects component 23 may store the changes in the visual effect. As another example, a visual effect for an object may be determined based on user input. Visual effects component 23 may store the identification of the visual effect for the object. When the object is taken out of the field of view of image sensor 13 and later brought back into the field of view of image sensor 13, visual effectors component 23 may determine the visual effect based on the stored changes/stored identification. Other types of stored information regarding visual effects are contemplated.

In some implementations, visual effects component 23 may be configured to obtain user input indicating a set of controls for a visual effect. Visual effects component 23 may obtain user input indicating a set of controls for a visual effect from one or more of a button device, a touch device, a point device, an imaging device, a sound device, and/or other input devices.

The set of controls may include one or more controls defining one or more actions for a visual effect. An action may refer to an act performed by a visual effect at a time, over a period of time, at a location, or over a range of locations. As a non-limiting example, an action may include one or more of a movement of a visual effect or a part of a visual effect (e.g., moving up/down/front/back/left/right, jumping, crouching, flying, etc.), a change in a stance of a visual effect (e.g., attack stance, defense stance, etc.), a change in a tactic of a visual effect (e.g., attacking, defending, powering up, powering down, transforming into a different form, etc.), and/or other actions. Visual effects component 23 may be configured to modify the visual effect to simulate the visual effect executing an action corresponding to the user input.

Figure 6:
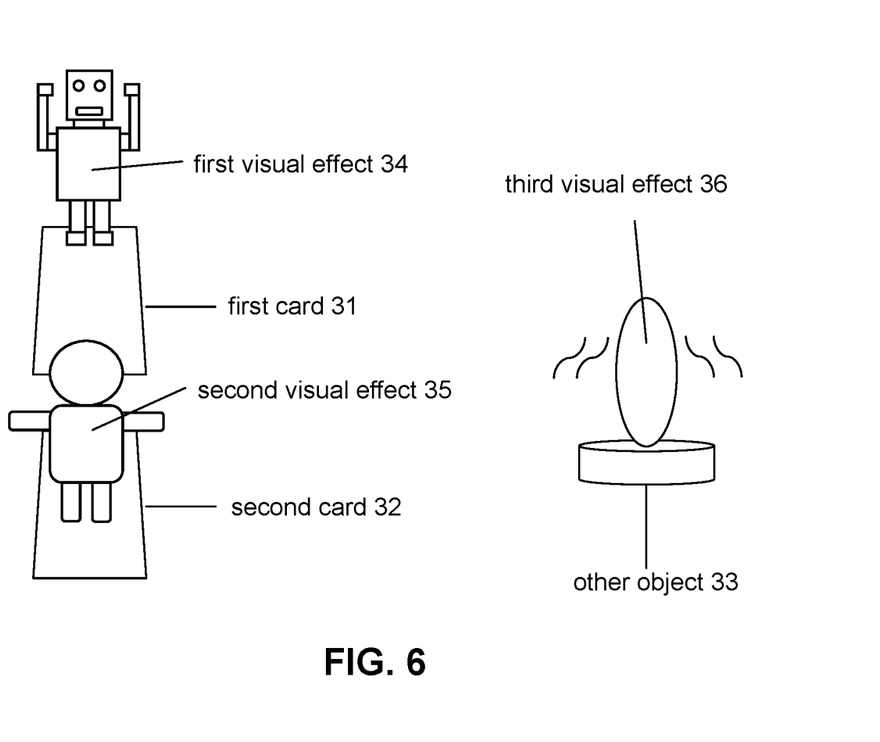
FIG. 6 illustrates an example of changes in visual effects augmenting three objects.

FIG. 6 illustrates non-limiting examples of changes in visual effects based on user input indicating sets of controls for visual effects. For example, visual effects component 23 may obtain from a sound device user input (e.g., a user spoken commands, etc.) indicating a set of controls for first visual effect 34. The set of controls for first visual effect 34 may include one or more controls defining a flying action for first visual effect 34. Visual effects component 23 may modify first visual effect 34 to simulate first visual effect 34 flying up.

As another example, visual effects component 23 may obtain from a button device user input (e.g., a rotation of an analog stick/press of a direction button on a game controller, etc.) indicating a set of controls for second visual effect 35. The set of controls for second visual effect 35 may include one or more controls defining a 180-degrees rotating action for second visual effect 35. Visual effects component 23 may modify second visual effect 35 to simulate second visual effect 35 rotating to face the other side.

As another example, visual effects component 23 may obtain user input indicating a set of controls for third visual effect 36 from other input device. The set of controls for third visual effect 36 may include one or more controls defining a shaking action for third visual effect 36. Visual effects component 23 may modify third visual effect 36 to simulate third visual effect 36 shaking. Other types of changes based on user input are contemplated.

Overlay position and orientation component 24 may be configured to determine overlay positions and/or overlay orientations for one or more visual effects. An overlay position and/or overlay orientation for a visual effect may be determined based on a position and/or orientation of an object. Overlay position and orientation component 24 may include or retrieve information (for example, a database, etc.) that matches a position and/or orientation of an object to an overlay position and/or an overlay orientation for a visual effect. For example, overlay position and orientation component 24 may determine an overlay position and/or overlay orientation for a visual effect based on a certain distance from an object and/or a certain orientation with respect to an object. For example, overlay position and orientation component 24 may determine an overlay position for a visual effect to be a certain distance in front of, behind, above, below, to the right, and/or to the left of the object. Overlay position and orientation component 24 may determine an overlay orientation for a visual effect to be at a certain orientation with respect to the object.

For example, as shown in FIG. 5, overlay position and orientation component 24 may determine an overlay position and/or overlay orientation for first visual effect 34 based on the position and/or orientation of first card 31. As another example, overlay position and orientation component 24 may determine an overlay position and/or overlay orientation for second visual effect 35 based on the position and/or orientation of the second card 32. As another example, overlay position and orientation component 24 may determine an overlay position and/or overlay orientation for third visual effect 36 based on the position and/or orientation of other object 33.

In some implementations, the overlay position and/or orientation of visual effects may be determined based on context of the visual effects and/or placement of objects. For example, an overlay position of a "terrain" visual effect may be placed below a "character" visual effect so that the "character" visual effect appears to be standing on top of the "terrain" visual effect. An overlay position and orientation of a "monster" visual effect may be placed inside a "cave" visual effect so that the "monster" visual effect appears to be looking out from inside the "cave" visual effect.

Overlay image component 25 may be configured to determine an overlay image. The overlay image may comprise one or more visual effects determined by visual effects component 23. For example, the overlay image may include one or more of first visual effect 34, second visual effect 35, and/or third visual effect 36. One or more visual effects may be placed within the overlay image according to the overlay position(s) and overlay orientation(s) for the visual effect(s). The overlay position and/or overlay orientation for a visual effect may change how the visual effect appears within the overlay image. For example, the overlay position and/or overlay orientation for the visual effect may change one or more of the position, the size, the shape, the tilt, the rotation, and/or other appearances of the visual effect.

Display component 26 may be configured to effectuate displaying of the overlay image on display 12. The displaying may be effectuated so that one or more visual effects appear to augment the appearance of one or more corresponding objects. For example, as shown in FIG. 5, displaying of an overlay may be effectuated on display 12 so that first visual effect 34 appear to augment the appearance of first card 31, second visual effect 35 appear to augment the appearance of second card 32, and third visual effect 36 appear to augment the appearance of other object 33. In some implementations, display component 26 may be configured to effectuate displaying of an overlay image within one or more of an image, a video, and/or other visual information based on the visual output signals generated by image sensor 13.

In some implementations, display component 26 may be configured to effectuate displaying of an overlay image on display 12, which allows light to be passed through display 12 in portions in which the overlay image does not contain a visual effect. For example, display 12 may include one or more of an optical head-mounted display and a user of display 12 may see light from the real world as well as the overlay image. In some implementations, display component 26 may be configured to change the transparency of one or more portions of display 12. For example, display component 26 may change the transparency of one or more portions of display 12 corresponding to the visual effect to block light from the real world passing through display 12.

Interaction component 27 may be configured to determine one or more interactions between visual effects. An interaction between visual effects may refer to an action of one visual effect based on and/or directed to another visual effect, and/or an influence one visual effect has on another visual effect. An action and/or an influence between visual effects may occur at a time, over a period of time, at a location, or over a range of locations. Interactions between visual effects may be determined based on the relative position of objects corresponding to visual effects. In some implementations, the relative positions of the objects may include a distance between the objects and an orientation of one object with respect to another object.

For example, interaction component 27 may be configured to determine an interaction between first visual effect 34 and second visual effect 35. The interaction between first visual effect 34 and second visual effect 35 may be determined based on the relative position of first card 31 and second card 32. For example, in FIG. 5, based on the distance between first card 31 and second card 32, interaction component 27 may determine an action for first visual effect 34 to attack second visual effect 35. The type of attack action may be determined based on the distance (e.g., hand-to-hand combat for close distance and ranged combat for far distance, etc.). As another example, based on the orientation of second card 32 to first card 31, interaction component 27 may determine an action for second visual effect 35 to turn around and face first visual effect 34. As another example, based on the distance between other object 33 and first card 31 and/or second card 32, and/or the orientation of other object 33 to first card 31 and/or second card 32, third visual effect 36 (e.g., energy field, etc.) may be activated. Other types of actions are contemplated.

As another example, based on the distance between first card 31 and second card 32, interaction component 27 may determine an influence of first visual effect 34 on second visual effect 35 (e.g., whether attack by first visual effect 34 hits second visual effect 35, the amount of damage taken by second visual effect 35 on receiving a hit, etc.). As another example, based on the orientation of second card 32 to first card 31, interaction component 27 may further determine the influence of first visual effect 34 on second visual effect 35 (e.g., higher chance of attack by first visual effect 34 hitting second visual effect 35 when second card 32 is facing away from first card 31, higher damage taken by second visual effect 35 when second card 32 is facing away from first card 31, etc.). As another example, based on the distance between other object 33 and first card 31 and/or second card 32, and/or the orientation of other object 33 to first card 31 and/or second card 32, interaction component 27 may determine the influence of third visual effect 36 (e.g., energy field, etc.) on first visual effect 34 and/or second visual effect 35 (e.g., power of first visual effect 34 and/or second visual effect 35 changing based on the distance and/or orientation, etc.). Other types of influence are contemplated.

In some implementations, interaction between visual effects may be determined based on interaction information. Interaction information may define how certain visual effects interact with other visual effects. Interaction information may be defined with respect to specific visual effects and/or classes of visual effects. For example, interaction information may define an attack action between "enemy" visual effects and an ignore/support action between "friendly" visual effects. Interaction information may define a particular movement action between a "character" visual effect and an "object" visual effect. For example, interaction information may define a "pick up" action for a "robot" visual effect when near a "weapon" visual effect. Interaction information may define a "climb-over" action or a "knock-down" action for a "monster" visual effect with respect to a "wall" visual effect.

Interaction information may allow one or more visual effects to understand context of their environment. For example, a "soldier" visual effect may be standing near a "car" visual effect. Interaction information may allow a "soldier" visual effect to understand whether it is fighting with an "enemy" visual effect. If the "soldier" visual effect is under fire from the "enemy" visual effect, the "soldier" visual effect may take cover behind the "car" visual effect. If the "soldier" visual effect is losing its fight against the "enemy" visual effect, the "soldier" visual effect may attempt to get in the "car" visual effect and drive away. Other types of interactions between visual effects are contemplated.

In some implementations, the interaction between visual effects may be determined further based on user input. For example, user input may indicate a set of controls for first visual effect 34 to change an action between first visual effect 34 and second visual effect 35 (e.g., change from hand-to-hand combat to ranged combat, etc.). The influence of attack by first visual effect 34 on second visual effect 35 may change based on the change of action (e.g., hand-to-hand combat and ranged combat having different probabilities of hitting and/or different amount of damage, etc.). As another example, user input may indicate a set of controls for second visual effect 35 to turn around and face first visual effect 34. The influence of attack by first visual effect 34 on second visual effect 35 may change based on second visual effect 35 facing first visual effect 34 (e.g., lower chance of attack by first visual effect 34 hitting second visual effect 35, lower damage taken by second visual effect on receiving a hit, etc.). As another example, user input may indicate a set of controls for third visual effect 36 to be deactivated. Third visual effect 36 (e.g., energy field, etc.) may have no influence on first visual effect 34 and/or second visual effect 35 based on being deactivated.

In some implementations, one or more visual effects may be characterized by one or more status parameter sets. A status parameter set may characterize one of more qualities of a visual effect. For example, a status parameter set may characterize one or more of power, health, energy, and/or other qualities of a visual effect. A status parameter set may be static or dynamic. For example, one or more of power, health, energy, and/or other qualities of a visual effect may remain constant or may change. For example, first visual effect 34 may be characterized by a first status parameter set. The first status parameter set may include a first power parameter defining a power of first visual effect 34 and/or other status parameters. As another example, second visual effect 35 may be characterized by a second status parameter set. The second status parameter set may include a second power parameter defining a power of second visual effect 35 and/or other status parameters. A power of a visual effect may refer to an ability of the visual effect to influence other visual effects and/or an ability of the visual effect to change influence from other visual effects. Other types of status parameter sets are contemplated.

In some implementations, a status parameter set of a visual effect may be determined based on the object, a part of the object, an augmented reality marker, user input, and/or other information regarding the object. For example, a status parameter set of first visual effect 34 may be determined based on first card 31, a part of first card 31 (e.g., shapes and characters on the left side of first card 31 that provide information about the rectangular robot), user input relating to first card 31, and/or other information regarding first card 31. As another example, a status parameter set of second visual effect 35 may be determined based on second card 32, a part of first card 32 (e.g., AR marker 33 that provide information about the rounded robot), user input relating to second card 32, and/or other information regarding first card 32.

The interaction between the visual effects may be determined further based on one or more status parameter sets. For example, the interaction between first visual effect 34 and second visual effect 35 may be determined further based on the first status parameter set. For example, the first power parameter of first visual effect 34 may determine the influence of attack by first visual effect 34 on second visual effect 35 (e.g., higher power of first visual effect 34 resulting in higher damage taken by second visual effect 35 on receiving a hit, etc.). As another example, the interaction between the first visual effect and the second visual effect may be determined further based on the second status parameter set. For example, the second power parameter of second visual effect 35 may determine the influence of attack by first visual effect 34 on second visual effect 35 (e.g., higher power of second visual effect 35 resulting in lower damage taken by second visual effect 35 on receiving a hit, etc.). Other interactions based on one or more status parameter sets are contemplated.

In some implementations, interaction component 27 may be configured to change one or more status parameter sets. For example, interaction component 27 may be configured to change the first status parameter set. The first status parameter set may be changed by interaction component 27 based on the interaction between first visual effect 34 and other visual effect(s). For example, based on first visual effect 34 missing and/or losing a fight to second visual effect 35, the first status parameter set may be decreased. As another example, based on first visual effect 34 being powered by third visual effect 36, the first status parameter set may be increased. Other types of changes in status parameter sets are contemplated.

In some implementations, interaction component 27 may be configured to modify one or more visual effects. For example, interaction component 27 may be configured to modify first visual effect 34. First visual effect 34 may be modified by interaction component 27 based on one or more changes to the first status parameter set. For example, based on an increase in the first status parameter set, first visual effect 34 may be modified to reflect an increase in power of first visual effect 34 (e.g., first visual effect 34 transforming to a stronger form, a power aura emitting from first visual effect 34, faster movement by first visual effect 34, etc.). As another example, based on a decrease in the first status parameter set, first visual effect 34 may be modified to reflect a decrease in power of first visual effect 34 (e.g., transforming to a weaker form, slumping down, slower movement by first visual effect 35, etc.). Other types of modifications of visual effects are contemplated.

Although processor 11, display 12, image sensor 13, and electronic storage 14 are shown to be connected to a bus 15 in FIG. 1, any communication medium may be used to facilitate interaction between any components of system 10. One or more components of system 10 may communicate with each other through hard-wired communication, wireless communication, or both. For example, processor 11 may wirelessly communicate with display 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination.

Processor 11 may be configured to execute one or more of detection component 21, object position and orientation component 22, visual effects component 23, overlay position and orientation component 24, overlay image component 25, display component 26, interaction component 27, and/or other components by software; hardware; firmware; some combination of software, hardware, and/or firmware; and/or other mechanisms for configuring processing capabilities on processor 11.

It should be appreciated that although detection component 21, object position and orientation component 22, visual effects component 23, overlay position and orientation component 24, overlay image component 25, display component 26, and interaction component 27 are illustrated in FIG. 1 as being co-located within a single processing unit, in implementations in which processor 11 comprises multiple processing units, one or more of detection component 21, object position and orientation component 22, visual effects component 23, overlay position and orientation component 24, overlay image component 25, display component 26, and/or interaction component 27 may be located remotely from the other computer program components.

The description of the functionality provided by the different computer program components 21, 22, 23, 24, 25, 26, and/or 27 described herein is for illustrative purposes, and is not intended to be limiting, as any of computer program components 20, 21, 22, 23, 24, 25, 26, and/or 27 may provide more or less functionality than is described. For example, one or more of computer program components 20, 21, 22, 23, 24, 25, 26, and/or 27 may be eliminated, and some or all of its functionality may be provided by other computer program components 20, 21, 22, 23, 24, 25, 26, and/or 27. As another example, processor 11 may be configured to execute one or more additional computer program components that may perform some or all of the functionality attributed to one or more of computer program components 20, 21, 22, 23, 24, 25, 26, and/or 27.

Although display 12 is depicted in FIG. 1 as a single element, this is not intended to be limiting. Display 12 may include one or more displays in one or more locations.

Although image sensor 13 is depicted in FIG. 1 as a single element, this is not intended to be limiting. Image sensor 13 may include one or more image sensors in one or more locations.

The electronic storage media of electronic storage 14 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 14 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 14 may be a separate component within system 10, or electronic storage 14 may be provided integrally with one or more other components of system 10 (e.g., processor 11). Although electronic storage 14 is shown in FIG. 1 as a single entity, this is for illustrative purposes only. In some implementations, electronic storage 14 may comprise a plurality of storage units. These storage units may be physically located within the same device, or electronic storage 14 may represent storage functionality of a plurality of devices operating in coordination.

Figure 2A:
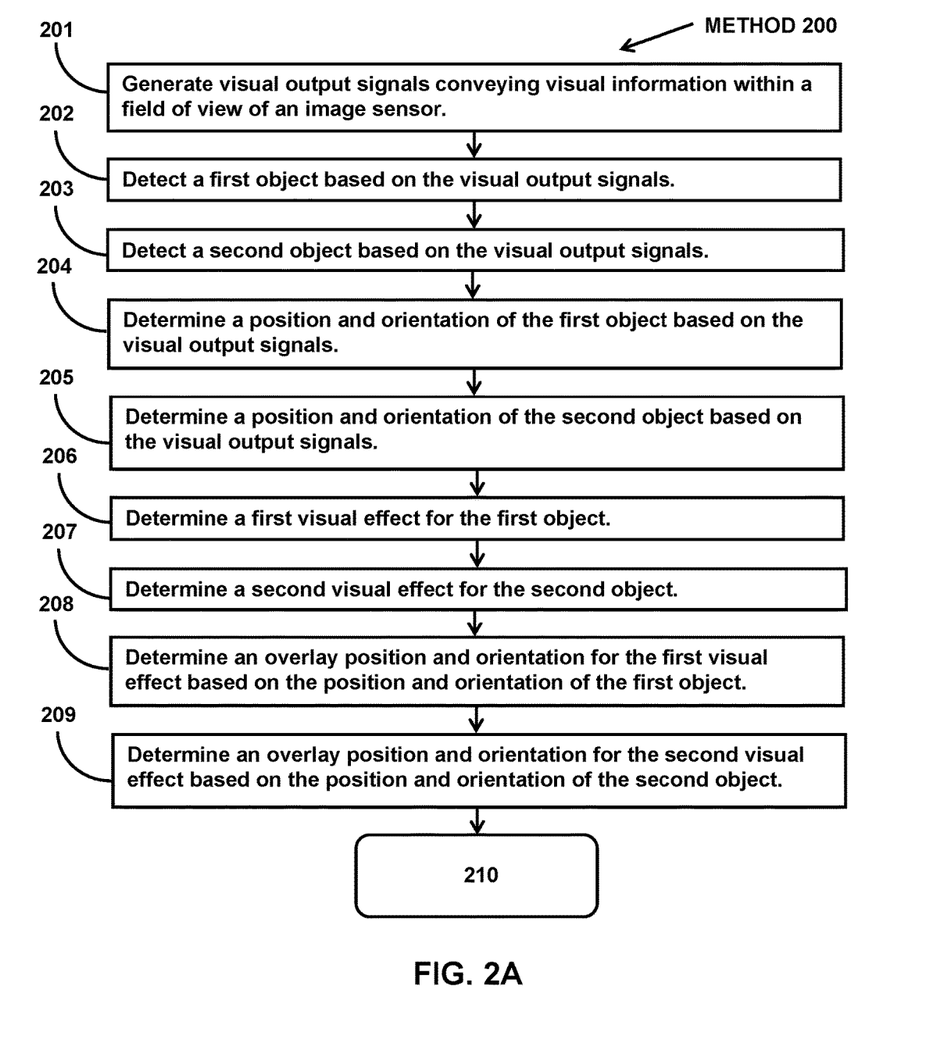
FIGS. 2A-2B illustrate a method for providing augmented reality experience based on a relative position of objects.
Figure 2B:
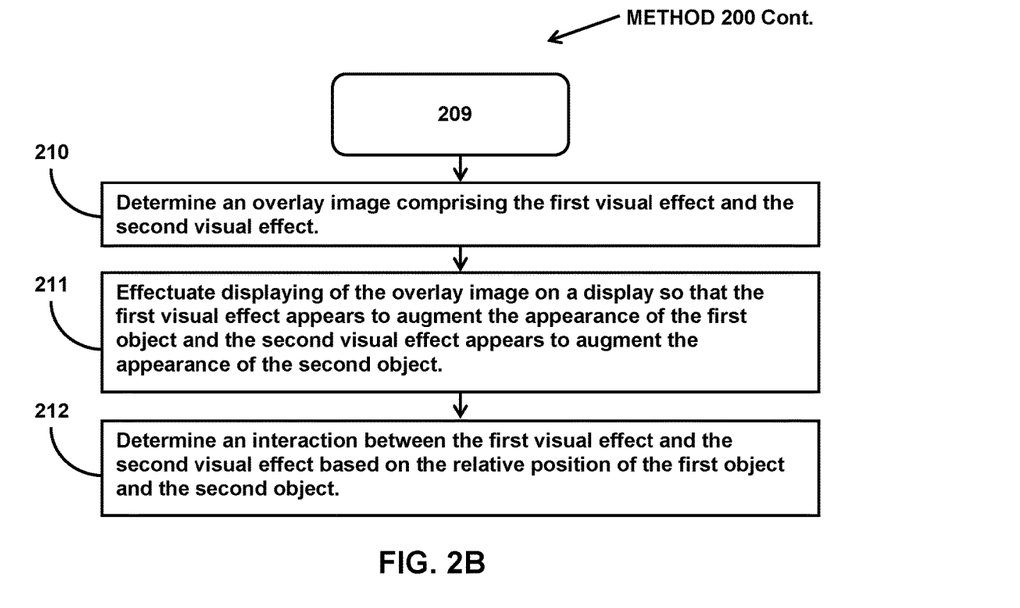

FIGS. 2A-2B illustrate method 200 for providing augmented reality experience based on a relative position of objects. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2A and method 200, at operation 201, visual output signals conveying visual information within a field of view of an image sensor may be generated. Visual information may include one or more of an image, a video, and/or other visual information. In some implementations, operation 201 may be performed by one or more sensors the same as or similar to image sensor 13 (shown in FIG. 1 and described herein).

At operation 202, a first object may be detected based on the visual output signals. At operation 203, a second object may be detected based on the visual output signals. In some implementations, operations 202 and/or 203 may be performed by a processor component the same as or similar to detection component 21 (shown in FIG. 1 and described herein).

At operation 204, a position and orientation of the first object may be determined based on the visual output signals. At operation 205, a position and orientation of the second object may be determined based on the visual output signals. In some implementations, operations 204 and/or 205 may be performed by a processor component the same as or similar to object position and orientation component 22 (shown in FIG. 1 and described herein).

At operation 206, a first visual effect may be determined for the first object. At operation 207, a second visual effect may be determined for the second object. In some implementations, operations 206 and/or 207 may be performed by a processor component the same as or similar to visual effects component 23 (shown in FIG. 1 and described herein).

At operation 208, an overlay position and orientation for the first visual effect may be determined based on the position and orientation of the first object. At operation 209, an overlay position and orientation for the second visual effect may be determined based on the position and orientation of the second object. In some implementations, operations 208 and/or 209 may be performed by a processor component the same as or similar to overlay position and orientation component 24 (shown in FIG. 1 and described herein).

Referring to FIG. 2B, at operation 210, an overlay image comprising the first visual effect and the second visual effect may be determined. The first visual effect may be placed within the overlay image according to the overlay position and overlay orientation for the first visual effect. The second visual effect may be placed within the overlay image according to the overlay position and overlay orientation for the second visual effect. In some implementations, operation 210 may be performed by a processor component the same as or similar to overlay image component 25 (shown in FIG. 1 and described herein).

At operation 211, displaying of the overlay image on a display may be effectuated so that the first visual effect appears to augment the appearance of the first object and the second visual effect appears to augment the appearance of the second object. In some implementations, operation 211 may be performed by a processor component the same as or similar to display component 26 (shown in FIG. 1 and described herein).

At operation 212, an interaction between the first visual effect and the second visual effect may be determined based on the relative position of the first object and the second object. In some implementations, operation 212 may be performed by a processor component the same as or similar to interaction component 27 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:
1. A system configured to provide an augmented reality experience, the system comprising:
 a display configured to display an overlay image;
 an image sensor configured to generate visual output signals conveying visual information within a field of view of the image sensor, the visual information including depictions of a first object and a second object present in the real world;
 one or more physical processors configured by machine readable instructions to:
  detect presence of the first object based on the visual output signals;
  detect presence of the second object based on the visual output signals;
  determine a position and orientation of the first object based on the visual output signals;
  determine a position and orientation of the second object based on the visual output signals;
  determine a relative orientation between the first object and the second object;
  determine a first visual effect for the first object;
  determine a second visual effect for the second object;
  determine an overlay position and overlay orientation for the first visual effect based on the position and orientation of the first object;

determine an overlay position and overlay orientation for the second visual effect based on the position and orientation of the second object;

determine the overlay image comprising the first visual effect and the second visual effect, wherein the first visual effect is placed within the overlay image according to the overlay position and overlay orientation for the first visual effect and the second visual effect is placed within the overlay image according to the overlay position and overlay orientation for the second visual effect;

effectuate presentation of the overlay image on the display so that the first visual effect appears to augment an appearance of the first object within the real world and the second visual effect appears to augment an appearance of the second object within the real world; and determine an interaction between the first visual effect and the second visual effect based on the relative orientation between the first object and the second object.

2. The system of claim 1, wherein the one or more physical processors are further configured by machine readable instructions to:

obtain user input, the user input indicating a set of controls for the first visual effect, the set of controls including a first control defining a first action for the first visual effect; and modify the first visual effect to simulate the first visual effect executing an action corresponding to the user input.

3. The system of claim 2, wherein the interaction between the first visual effect and the second visual effect are determined further based on the user input.

4. The system of claim 1, wherein by virtue of the relative orientation between the first object and the second object being a first relative orientation, the interaction is determined to be a first interaction, and by virtue of the relative orientation between the first object and the second object being a second relative orientation, the interaction is determined to be a second interaction.

5. The system of claim 1, wherein the first visual effect is characterized by a first status parameter set, the first status parameter set including a first power parameter defining a power of the first visual effect, and wherein the interaction between the first visual effect and the second visual effect are determined further based on the first status parameter set.

6. The system of claim 5, wherein the second visual effect is characterized by a second status parameter set, the second status parameter set including a second power parameter defining a power of the second visual effect, and wherein the interaction between the first visual effect and the second visual effect are determined further based on the second status parameter set.

7. The system of claim 5, wherein the one or more physical processors are further configured by machine readable instructions to change the first status parameter set based on the interaction between the first visual effect and the second visual effect.

8. The system of claim 7, wherein the one or more physical processors are further configured by machine readable instruction to modify the first visual effect based on a change to the first status parameter set.

9. The system of claim 1, wherein the first object includes a first card and the second object includes a second card.

10. A method to provide an augmented reality experience, the method comprising:

generating visual output signals conveying visual information within a field of view of an image sensor, the visual information including depictions of a first object and a second object present in the real world;

detecting presence of the first object based on the visual output signals;

detecting presence of the second object based on the visual output signals;

determining a position and orientation of the first object based on the visual output signals;

determining a position and orientation of the second object based on the visual output signals;

determining a relative orientation between the first object and the second object;

determining a first visual effect for the first object;

determining a second visual effect for the second object;

determining an overlay position and overlay orientation for the first visual effect based on the position and orientation of the first object;

determining an overlay position and overlay orientation for the second visual effect based on the position and orientation of the second object;

determining an overlay image comprising the first visual effect and the second visual effect, wherein the first visual effect is placed within the overlay image according to the overlay position and overlay orientation for the first visual effect and the second visual effect is placed within the overlay image according to the overlay position and overlay orientation for the second visual effect;

effectuating presentation of the overlay image on a display so that the first visual effect appears to augment an appearance of the first object within the real world and the second visual effect appears to augment an appearance of the second object within the real world; and determining an interaction between the first visual effect and the second visual effect based on the relative orientation between the first object and the second object.

11. The method of claim 10, further comprising:

obtaining user input, the user input indicating a set of controls for the first visual effect, the set of controls including a first control defining a first action for the first visual effect; and modifying the first visual effect to simulate the first visual effect executing an action corresponding to the user input.

12. The method of claim 11, wherein the interaction between the first visual effect and the second visual effect are determined further based on the user input.

13. The method of claim 10, wherein by virtue of the relative orientation between the first object and the second object being a first relative orientation, the interaction is determined to be a first interaction, and by virtue of the relative orientation between the first object and the second object being a second relative orientation, the interaction is determined to be a second interaction.

14. The method of claim 10, wherein the first visual effect is characterized by a first status parameter set, the first status parameter set including a first power parameter defining a power of the first visual effect, and wherein the interaction between the first visual effect and the second visual effect are determined further based on the first status parameter set.

15. The method of claim 14, wherein the second visual effect is characterized by a second status parameter set, the second status parameter set including a second power parameter defining a power of the second visual effect, and wherein the interaction between the first visual effect and the second visual effect are determined further based on the second status parameter set.

16. The method of claim 14, further comprising changing the first status parameter set based on the interaction between the first visual effect and the second visual effect.

17. The method of claim 16, further comprising modifying the first visual effect based on a change to the first status parameter set.

18. The method of claim 10, wherein the first object includes a first card and the second object includes a second card.

19. A system configured to provide an augmented reality experience, the system comprising:
- a display configured to display an overlay image;
- an image sensor configured to generate visual output signals conveying visual information within a field of view of the image sensor, the visual information including depictions of a first object and a second object present in the real world;
- one or more physical processors configured by machine readable instructions to:
    - detect presence of the first object based on the visual output signals;
    - detect presence of the second object based on the visual output signals;
    - determine a position and orientation of the first object based on the visual output signals;
    - determine a position and orientation of the second object based on the visual output signals;
    - determine a relative orientation between the first object and the second object;
    - determine a first visual effect for the first object;
    - determine a second visual effect for the second object;
    - determine an overlay position and overlay orientation for the first visual effect based on the position and orientation of the first object;
    - determine an overlay position and overlay orientation for the second visual effect based on the position and orientation of the second object;
    - determine the overlay image comprising the first visual effect and the second visual effect, wherein the first visual effect is placed within the overlay image according to the overlay position and overlay orientation for the first visual effect and the second visual effect is placed within the overlay image according to the overlay position and overlay orientation for the second visual effect;
    - effectuate presentation of the overlay image on the display so that the first visual effect appears to augment the appearance of the first object and the second visual effect appears to augment the appearance of the second object;
    - determine an interaction between the first visual effect and the second visual effect based on the relative orientation between the first object and the second object;
    - obtain user input, the user input indicating a set of controls for the first visual effect, the set of controls including a first control defining a first action for the first visual effect; and
    - modify the first visual effect to simulate the first visual effect executing an action corresponding to the user input.

20. The system of claim 19, wherein the interaction between the first visual effect and the second visual effect are determined further based on the user input.

* * * * *